May 22, 1951 W. M. LONGHENRICH 2,554,303
COMBINED CASE AND KEY CHAIN HOLDER
Filed July 17, 1948
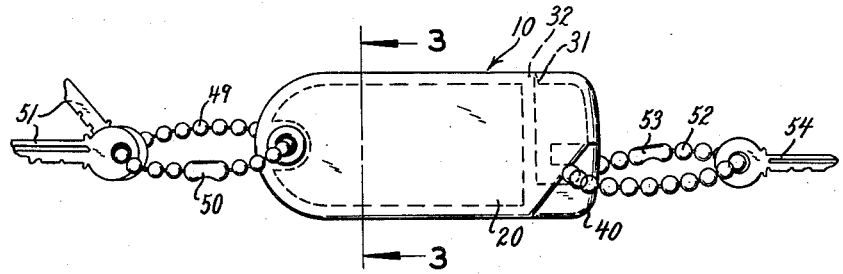
FIG. 1
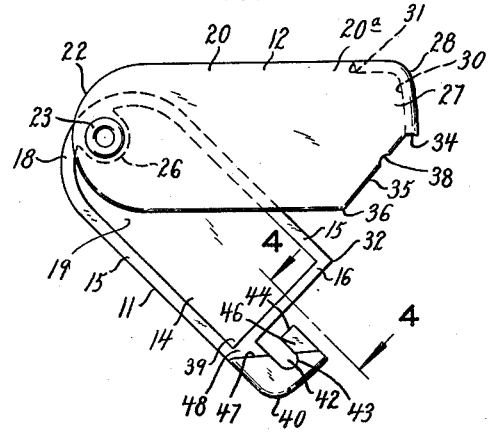
FIG. 2
FIG. 3
FIG. 4
FIG. 6
FIG. 5
INVENTOR
WALTER M. LONGHENRICH
BY George A. Woodruff
ATTORNEY Patented May 22, 1951

2,554,303

UNITED STATES PATENT OFFICE 2,554,303

COMBINED CASE AND KEY CHAIN HOLDER

Walter M. Longhenrich, Florissant, Mo., assignor to Skinner & Kennedy Company, St. Louis, Mo., a corporation of Missouri Application July 17, 1948, Serial No. 39,250

2 Claims. (Cl. 24—116)

This invention relates to improvements in key holders, and has particular reference to a combination container and key holder device of a novel and useful character.

The principal object of the invention is to provide a combination container or case and key holder device which is of a novel, yet relatively simple construction, embodying provisions for the support of at least two key chains, wherein the provision for the support of one key chain is of a character to permit the chain to be readily and quickly separated from or attached to the device.

While the device of the character indicated in the foregoing object, may be used generally as a case for business cards, identification tags, coins and other objects of a size capable of being received in the case, and as a holder for one or more key chains, it is especially suitable for use in connection with the operation of automotive vehicles. It is well known that the operators of many automobile parking lots and parking garages require the ignition key to be left with the vehicle received for parking. Accordingly, in the use of the present device, the ignition key is mounted on the chain which is readily removable from the key holder, so that such key and its chain may be left with the parked automobile, while the holder device including the other key chain on which may be office keys or the like, is retained by the owner or driver. A further utility of the present device when used in connection with the operation of automobiles, resides in the suitability of the container as a case for the operator's driving license and one or more coins. With the now wide spread installation of parking meters, a distinct advantage is presented by the container portion of the key holder device, since coins of parking meter denominations may be placed therein, for use in meter parking. Thus is avoided the inconvenience attendant upon search through a coin purse or loose pocket change, for a coin to insert in the meter.

It is another object of the present invention to provide a device of the character described, which is comprised of a container or tray member and a closure member therefor, wherein one member affords a seat for the removable key chain, and the other affords means for locking the chain in the seat when the members are closed.

A further object resides in the provision on the closure member of the device, of means for urging or camming the removable key chain into position in the chain seat.

Other objects as well as particular advantages of the invention, will appear from the following description of a presently preferred embodiment thereof, illustrated by the accompanying drawing, wherein:

Fig. 1 is a top plan view of the case and key holder device according to the present invention, the view showing two key chains thereon;

Fig. 2 illustrates the case partly open, and shows certain details of the structure thereof;

Fig. 3 is a sectional view transversely of the device, as taken along line 3—3 in Fig. 1;

Fig. 4 is a fragmentary detail view of the device in the region of the support for the removable key chain, as taken along line 4—4 in Fig. 2;

Fig. 5 is an enlarged fragmentary top view of the device, illustrating a feature thereof, and Fig. 6 is a view similar to that of Fig. 5, but showing the case and closure partly open.

Referring to the drawing by suitable characters of reference, there is illustrated a case and key chain holder 10 (Fig. 1) of a presently preferred construction, embodying the features of the present invention. Device 10 comprises two members 11 and 12, the member 11 being formed as a plate, a case or tray-like receptacle, while the member 12 is adapted to afford a closure or cover therefor. Member 11 may be considered as a modified plate, and includes a bottom wall 14, opposite side walls 15, and end wall 16 and an opposite end wall 18 which as preferred, is approximately semi-circular in extent, as shown. The walls thus define an open-top recess or pocket 19. Closure or cover member 12 is formed to provide a pair of plate elements 20, 20a arranged in parallel and spaced apart sufficiently to receive and closely embrace the member 11, the member affording through one of the plates, as 20a, a cover for the pocket 19. The ends 22 of the plate elements are curved in conformity with the curvature of the end wall 18 of member 11, and are pivotally secured to the latter member as by a hollow rivet 23 the shank or stem 24 of which extends through a boss 26 integral with the rounded end of member 11. The plates 20, 20a are of equal longitudinal extent and such that in the closed position of the members, the plate ends 27 project beyond the end wall 16 of tray member 11. The corresponding corner margins 28 at the plate ends 27, are rigidly united by a side wall element 30, the terminal end 31 of the side wall element being located such that in closure of the case, it is closely adjacent the corner 32 of the tray member (Fig. 1). The opposite end 34 of wall element 30, is substantially midway of the lateral extent of the plates at the ends 27. Each plate in its end portion 27, further has a substantially linear margin 35 extending from the inner edge or side of wall end 34, rearwardly of the plate at a suitable angle to the longitudinal axis of the plate, preferably at an angle of about 60 degrees, to juncture with the side margin 36 (Fig. 2). The margins 35 are in parallel and each has a circular notch or recess 38 therein, the recesses 38 being in register transversely of the member.

Extending forwardly from the corner 39 of tray member 11, is a reversely turned projection providing a hook-like element 40 having a hook recess 42 partly circular at 43 in its inner end. The free end 44 of the hook tongue 46 is opposed to the end wall 16 and spaced a predetermined distance therefrom. The recess 42 affords a mounting seat for a key chain, as will be referred to hereinafter. The projection 40 is bossed on each side to provide shoulders 47 each interrupted intermediate its length by the circular portion 43 of the recess 42, the shoulders being directed such as to abut or lie close to the inclined margins 35 of member 12 when the holder is closed (Fig. 5). The shank portion 48 of hook projection 40 and the tongue element 46 thereof, are of a thickness such that in case closure, these elements are received between the plates 20, 20a of member 12, which is thus of bifurcate form as shown in dotted outline in Fig. 1.

Carried by the holder is a key chain 49 which is here shown to be of a ball and link character, the chain passing through the hollow rivet 23 and having its ends connected together by a suitable connector element 50. On the chain may be one or more keys 51, which may be office keys, house keys or the like. A second similar key chain 52 having its ends connected by device 53, has at least one key 54 thereon, which in accordance with the particular utility of the present invention as hereinbefore pointed out, may be the ignition key of an automotive vehicle. Chain 52 is removably carried by the case or holder device 10, in extension through the seat 42 as appears in Fig. 1. In mounting the chain, the case is opened sufficiently at least (Fig. 2), to permit passage of the chain balls 56 between the end 44 of hook tongue 46 and the case wall 16, and thence into the recess seat 42. Whereupon the cover member 12 is pivotally moved to embrace and close the case member 11, as in Fig. 1, which serves to locate the cover margins 35 over the tongue 46 and closely adjacent the hook shoulders 47, thereby confining the chain to seat 42 between the circular portion 43 thereof and the circular notches 38 in cover margins 35. Removal of the chain 52 is accomplished merely by opening the case and lifting the chain from the hook 40.

An important feature of the present holder device resides in the inclined margins 35 of the cover member, which here afford camming elements in chain seating. With reference to Fig. 6, the chain 52 may be slipped over the hook 40 and allowed to hang freely over the hook shank portion 48. Then as the cover member 12 is moved to close the case member 11, the cover margins 35 will engage the chain and displace or cam the same toward and into the hook seat 42, against the circular end 43 thereof. In so doing, the leading edge or lip 57 of each notch 38 (Fig. 5), will snap over a chain ball element 56 or pass between adjacent balls, to seat the chain in the notches 38 of the cover margins. Thus the chain is automatically seated in seat 42 upon closure of the case.

A further feature of the invention is found in the lips 57 of the notches 38. These lips in the closed condition of the case or holder, engage the chain on one side of that diameter of chain ball 56 which is coincident with a line paralleling the longitudinal axis of the holder, as appears in Fig. 5. Consequently, if the chain is directed laterally from the holder and a pull is exerted thereon as in the direction of arrow 58, tending to pivot the case member 11 to open position relative to the cover member 12, the chain will bear against the lips 57, thereby preventing opening movement of the case member 11. Accordingly, to open the case or holder device, the members 11 and 12 must be pivoted apart by manual force exerted directly on the members. To this end, the cover member 12 is held by the fingers of one hand, while the hook projection 40 of member 11, then serving as a finger piece or handle, is grasped between the thumb and forefinger of the other hand. Opposite pulling then will effect relative pivoting of the members to uncover or expose the recess or pocket 19 of the tray member, as well as to position the hook 40 to permit ready removal of chain 52.

As before noted, the present device is of particular utility in connection with the operation of automotive vehicles. The vehicle ignition key 54 which is on the removable chain 52, may be left with the vehicle when parked, while the holder 10 and key chain 49 having office or other keys 51 thereon, is retained in physical possession by the vehicle owner or driver. Further, in meter parking, coins of appropriate denomination contained in the case portion of the holder, are thereby readily available for insertion in the parking meter. The case additionally affords a convenient holder for the operator's driving license and an identification card or the like.

From the foregoing description of the combined case and key chain holder, it will appear now that the case and closure members are so constructed and related in assembly, that in the closed condition thereof, the case member including portions of the hook projection, is contained between the closure plates, while the bossed portion of the hook projection completes the plane surfaces of the closure member, so that the result is a substantially rectangular, box-like holder.

The case member 11, as well as the closure member 12, may be and preferably is, formed of suitable plastic material molded to produce a one-piece member of the structural character hereinabove fully described. While plastic is preferred, it will be readily appreciated that the holder parts may be of metal or other material as desired.

Having now described and illustrated a presently preferred embodiment of my invention, what I desire to claim and secure by Letters Patent is:

1. A device of the character described, for connecting two looped key chains of bead type, the device comprising two substantially rectangular plate members, normally one over the other, a hollow pivot element in corresponding end regions of, and connecting said members for divergent, separating movement, the hollow pivot element serving to receive one of the looped chains to be connected to the device, one of the plate members, at its end opposite the pivoted end, having a projection of hook form, a part of the projection being shouldered along a line at an acute angle to a longitudinal median of the device, the second plate member having a matching, acute angled margin normally abutting the said shouldered part of the first said plate member, and provided intermediate its ends with a recess opening into such margin, and overlying the chain-seating portion of the hook, the recess and chain-seating portion of the hook providing a chain passage depthwise of the plate members which is substantially fully occupied by the second chain to be connected to the device, the said shouldered portion of the first plate member, and the matching margin of the second plate member being located in a corner region of the device, and at one side of the longitudinal median therethrough.

2. The combination, arrangement and features of the elements recited by claim 1, but further characterized in that the second said plate member is comprised of planar parts spaced to receive the first plate member therebetween and substantially overlie the top and bottom of such first member, and further characterized in that the recess in the acute-angled margin of the second plate member is of a form and depth to engage the beads of the adjacent chain at points beyond a longitudinal line intersecting the wire of the bead chain therein.

WALTER M. LONGHENRICH.

REFERENCES CITED

The following references are of record in the file of this patent:

UNITED STATES PATENTS

| Number | Name | Date |
| --- | --- | --- |
| 413,421 | Van Norman | Oct. 22, 1889 |
| 760,410 | Arnold | May 24, 1904 |
| 811,693 | Clavo | Feb. 6, 1906 |
| 939,531 | Morrow | Nov. 9, 1909 |
| 1,067,123 | Lyerla | July 8, 1913 |
| 1,314,832 | Roberts | Sept. 2, 1919 |
| 1,443,889 | Williams | Jan. 30, 1923 |
| 1,713,153 | Webber | May 14, 1929 |
| 1,984,069 | Larter | Dec. 11, 1934 |
| 2,298,248 | Ballou | Oct. 6, 1942 |